(12) United States Patent
Stevens

(10) Patent No.: US 10,621,884 B2
(45) Date of Patent: Apr. 14, 2020

(54) WRITING AID

(71) Applicant: Kimberly R. Stevens, Williamston, NC (US)

(72) Inventor: Kimberly R. Stevens, Williamston, NC (US)

(*) Notice: Subject to any disclaimer, the term of this patent is extended or adjusted under 35 U.S.C. 154(b) by 194 days.

(21) Appl. No.: 15/788,187

(22) Filed: Oct. 19, 2017

(65) Prior Publication Data

US 2018/0137769 A1     May 17, 2018

Related U.S. Application Data

(60) Provisional application No. 62/420,777, filed on Nov. 11, 2016.

(51) Int. Cl.
*G09B 11/04*     (2006.01)

(52) U.S. Cl.
CPC ..................... *G09B 11/04* (2013.01)

(58) Field of Classification Search
USPC ............... 434/85, 87, 88, 162–166; 33/41.2, 33/562–564
See application file for complete search history.

(56) References Cited

U.S. PATENT DOCUMENTS

| | | |
|---|---|---|
| 391,419 A | 10/1888 | McCulloch |
| 399,768 A | 3/1889 | Mehrer |
| 598,666 A | 2/1898 | Thomas |
| 627,132 A | 6/1899 | McBride |
| 651,894 A | 6/1900 | Shermer |
| 890,076 A * | 6/1908 | Lobdell ................. G09B 11/04 283/45 |
| 1,006,393 A * | 10/1911 | Montgomery ......... G09B 11/04 101/112 |
| 1,122,110 A * | 12/1914 | Hansen .................. G09B 11/04 434/165 |
| 1,232,116 A | 7/1917 | Stechan |
| 1,353,279 A * | 9/1920 | Schulthess ............... B43L 7/00 116/240 |
| 1,538,331 A | 10/1923 | Jett |
| 1,531,249 A | 3/1925 | Barman |
| 1,607,544 A | 8/1926 | McCready |
| 1,862,573 A | 10/1931 | Grosz |
| 2,081,893 A | 12/1935 | Lozier |

(Continued)

OTHER PUBLICATIONS

Typoscope, 3 ½×5 inches, MaxiAids, ASIN: B00011R5ZG, UPC: 612750921803, Amazon.com, earliest of two reviews dated Jan. 7, 2012.

(Continued)

*Primary Examiner* — Kurt Fernstrom
(74) *Attorney, Agent, or Firm* — Ward and Smith, P.A.; Ryan K. Simmons

(57) ABSTRACT

A writing aid including a body portion; a cut-out region formed within the body portion; and a spacer symbol disposed on the body portion adjacent a left most side of the cut-out region. A method of using a writing aid, including positioning the writing aid on an article to write on; writing a first word within a cut-area of the writing aid beginning at the left most side of the cut-out area; moving the writing aid to position a spacer symbol relative to a last letter of the first word; and writing a second word within the cut-area of the writing aid beginning at the left most side of the cut-out area.

16 Claims, 6 Drawing Sheets

(56) References Cited

U.S. PATENT DOCUMENTS

| | | | |
|---|---|---|---|
| 2,337,405 A | | 4/1943 | Noel |
| 2,585,421 A | | 3/1950 | Armand |
| D184,834 S | | 4/1959 | Schlaechter |
| 2,913,836 A | * | 11/1959 | Strunk ................. G09B 21/002 281/45 |
| D216,439 S | | 1/1970 | Simms |
| 4,003,143 A | * | 1/1977 | Keitzer ................ G09B 21/002 434/117 |
| 4,183,143 A | | 1/1980 | Root |
| 4,186,683 A | | 2/1980 | LeRoy |
| 4,262,422 A | * | 4/1981 | Pass ...................... B43L 13/201 33/41.2 |
| D281,173 S | | 10/1985 | Bloom |
| 4,901,665 A | | 2/1990 | Carlin |
| D307,442 S | | 4/1990 | Cooper |
| D314,865 S | | 2/1991 | Tuisku |
| 5,027,523 A | * | 7/1991 | MacLeod ................. G09B 1/06 33/564 |
| 5,163,846 A | | 11/1992 | Lee |
| D332,467 S | | 1/1993 | Bardman |
| D355,216 S | | 2/1995 | Grant |
| 5,403,104 A | | 4/1995 | Cappellina |
| 5,441,278 A | | 8/1995 | Nalder |
| D374,459 S | | 10/1996 | Vartanian |
| 5,632,225 A | | 5/1997 | Krasner |
| D410,679 S | | 6/1999 | Blanchard |
| 6,142,783 A | * | 11/2000 | Rocha ................... G09B 11/00 434/162 |
| D469,121 S | | 1/2003 | Manzo |
| D483,077 S | | 12/2003 | Navarro-Machado |
| 6,832,915 B1 | | 12/2004 | Kirby |
| D504,336 S | | 4/2005 | Mason |
| D518,101 S | | 3/2006 | Boone-Johnson |
| 7,137,206 B2 | | 11/2006 | Lira-Nunez |
| 7,318,764 B2 | | 1/2008 | Elias |
| D660,733 S | | 5/2012 | Shotey et al. |
| D713,747 S | | 9/2014 | Collins |
| D720,805 S | | 1/2015 | Khayat et al. |
| D741,731 S | | 10/2015 | Lamanna et al. |
| D772,342 S | | 11/2016 | Navarro-Machado |
| D794,118 S | | 8/2017 | Petrie et al. |
| D803,937 S | | 11/2017 | Petrie et al. |
| D805,580 S | | 12/2017 | Jensen |
| D819,741 S | | 6/2018 | Clegg et al. |
| D835,187 S | | 12/2018 | Choi |
| D854,416 S | | 7/2019 | Sims et al. |
| 2003/0228559 A1 | | 12/2003 | Hajjar |
| 2006/0188853 A1 | * | 8/2006 | Mismas, Jr. ........... G09B 11/04 434/162 |
| 2009/0068626 A1 | * | 3/2009 | Schulken ............... G09B 11/00 434/162 |
| 2009/0301384 A1 | | 12/2009 | Beauregard |
| 2010/0121692 A1 | | 5/2010 | Top |
| 2016/0214425 A1 | | 7/2016 | Ko |
| 2018/0018897 A1 | | 1/2018 | Harris |

OTHER PUBLICATIONS amazon.com, "Adjust Writing Guide for Blind and Low Vision, by MaxiAids", 2 ratings, ASIN: B0001CHEGFO, UPC: 612750203480, Amazon.com, earliest review Jun. 21, 2015, 5 pages.

amazon.com, "Signature Guide—Spring Metal the Best, by MaxiAids", 13 ratings, ASIN: B0001BUZMQ, UPC: 612750804250, Amazon.com, earliest review Jul. 20, 2016, 7 pages.

* cited by examiner

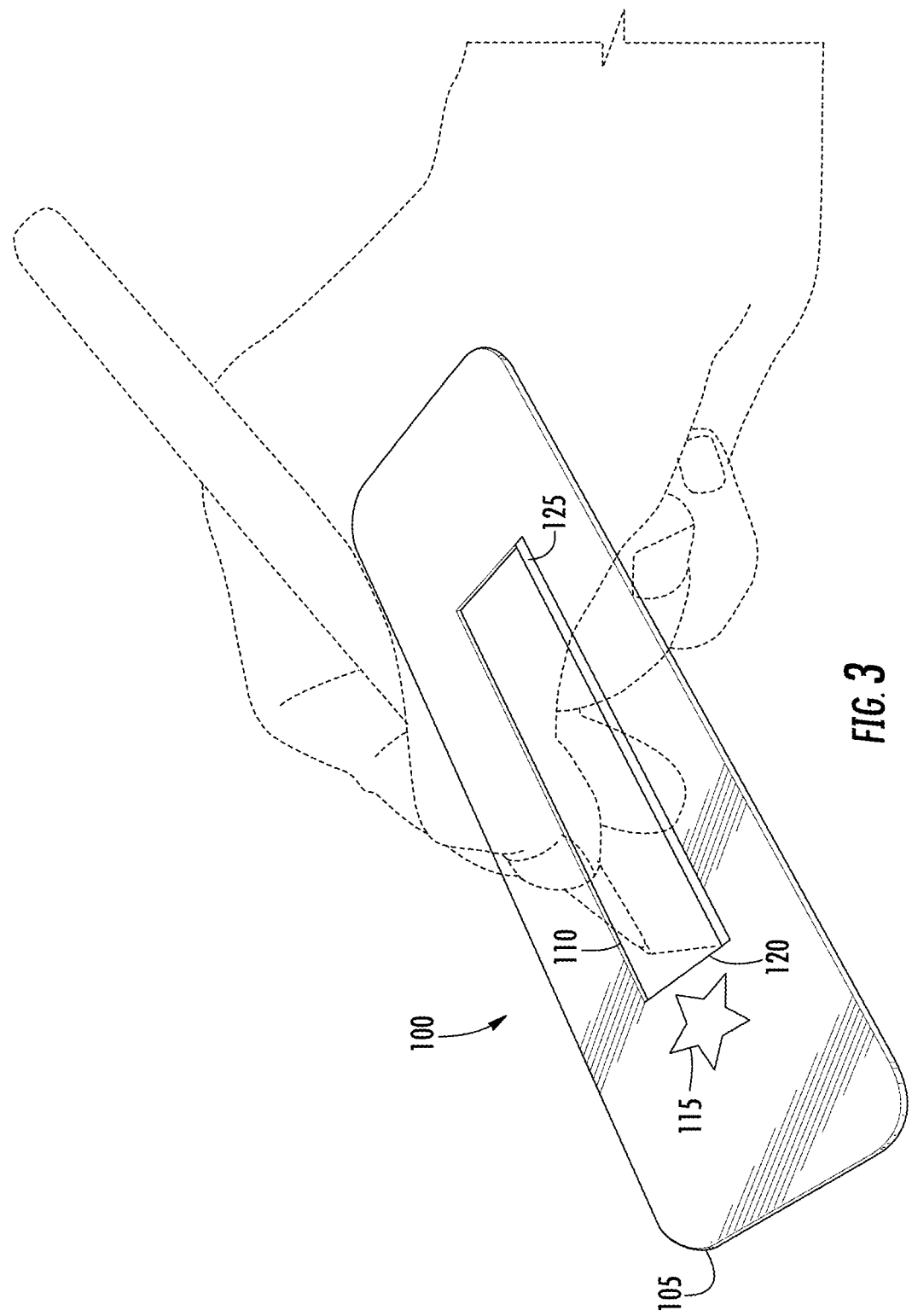

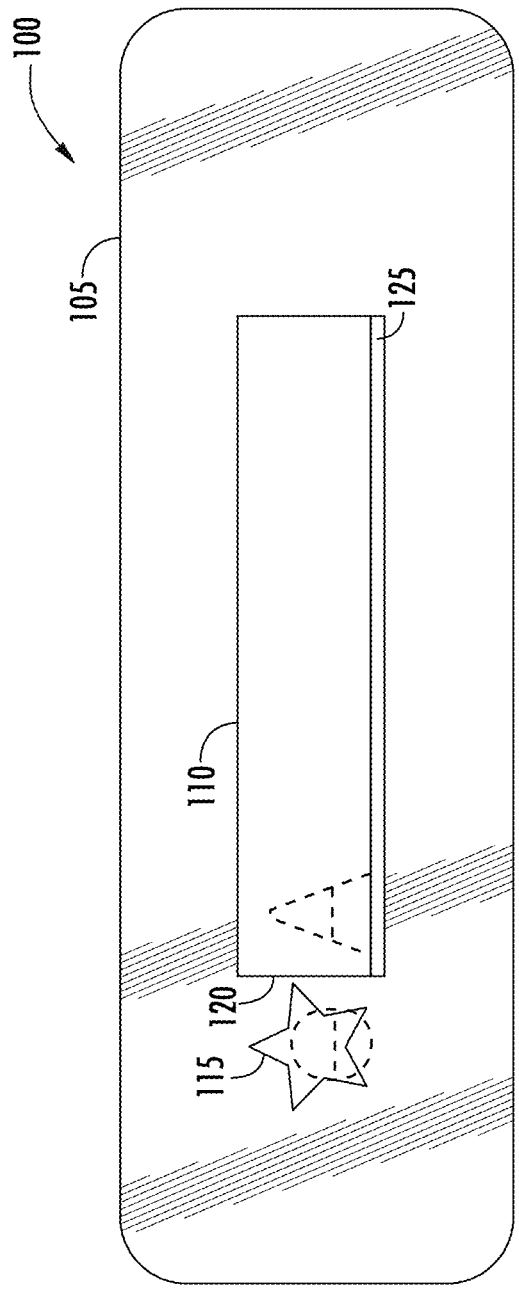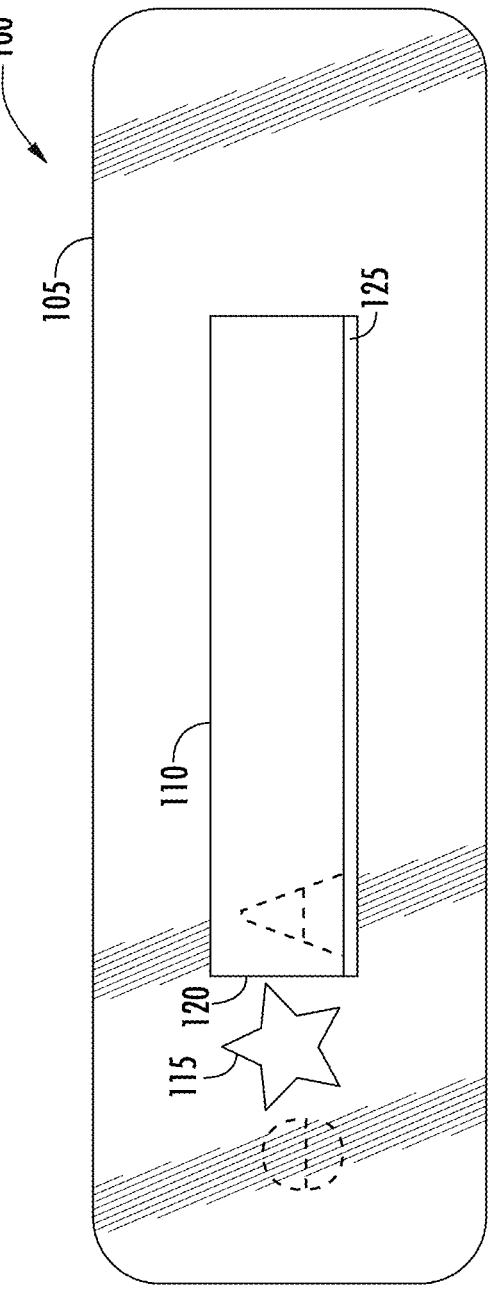

WRITING AID

RELATED APPLICATIONS

This application claims priority to and incorporates herein by reference related U.S. Provisional Patent Application No. 62/420,777, entitled "Spacer and Alignment tool to help children learn to space and align written work" filed on Nov. 11, 2016.

TECHNICAL FIELD

The disclosed subject matter relates generally to a writing aid and method of use thereof. Specifically, the disclosed subject matter relates to a spacer and alignment tool to help students learn to properly space, size, and align written work.

BACKGROUND

Many children or others learning to write (hereinafter referred to as "student" or "students") may encounter certain visual spatial and visual motor difficulties that impact the student's ability to properly space and align letters and words when learning how to write. These difficulties make it difficult for the student to write legible. This can make it challenging and frustration for the student to learn to write legibly, thus negatively impacting the student's development.

A writing aid is needed to help students learn to write legibly by helping them properly space, size, and align their written work.

SUMMARY

In one embodiment, the writing aid may include a body portion; a cut-out region formed within the body portion; and a spacer symbol disposed on the body portion adjacent a left most side of the cut-out region. The writing aid may further include an alignment bar disposed on the body portion adjacent a bottom edge of the cut-out region. The alignment bar may be about 2⅛ inches in length and about 1/16 of an inch wide. The alignment bar may be opaque or semi-opaque. The body portion and the cut-out region may be substantially rectangular. The body portion may be transparent or semitransparent. The spacer symbol may be opaque or semi-opaque. The body portion may be about 4 inches in length, 1¼ of an inch wide, and 1/64 of an inch thick. The cut-out region may be about 2⅛ inches in length and about ⅜ of an inch wide. The spacer symbol may be about ⅜ of an inch wide. The cut-out region may be centrally located within the body portion.

In another embodiment, a method of using the writing aid may include one or more of positioning a writing aid on an article to write on; writing a first word within a cut-out region of the writing aid beginning at the left most side of the cut-out region; moving the writing aid to position a spacer symbol relative to a last letter of the first word; and writing a second word within the cut-out region of the writing aid beginning at the left most side of the cut-out region. Moving the writing aid to position the spacer symbol may include positioning the writing aid such that the spacer symbol substantially overlaps the last letter of the first word, or alternatively may include positioning the writing aid such that the spacer symbol is positioned directly after the last letter of the first word. Positioning the writing aid on an article to write on may include aligning the alignment bar along a line of the paper to be written on.

Certain aspects of the subject matter of the invention having been stated hereinabove, which are addressed in whole or in part by the disclosed subject matter, other aspects will become evident as the description proceeds when taken in connection with the accompanying Examples and Drawings as best described herein below.

BRIEF DESCRIPTION OF THE DRAWINGS

Figure 1:
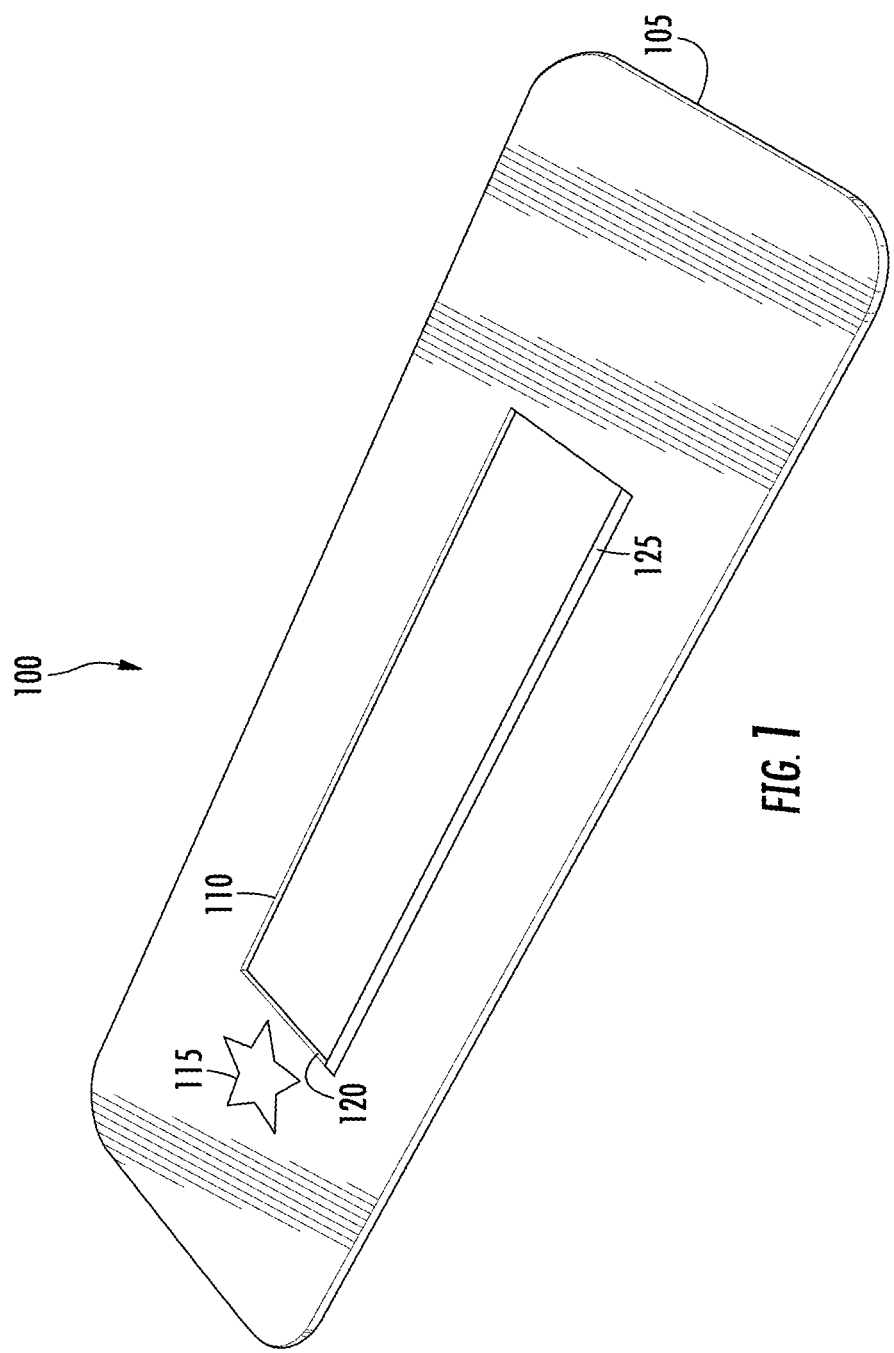
Figure 2:
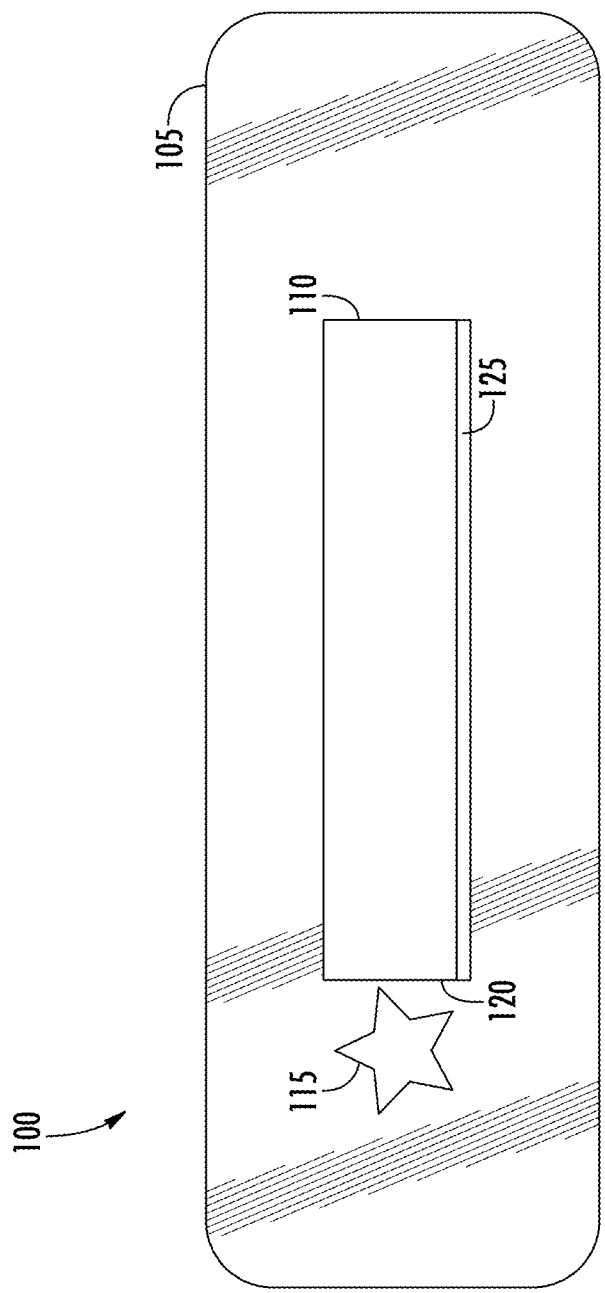
Figure 5:
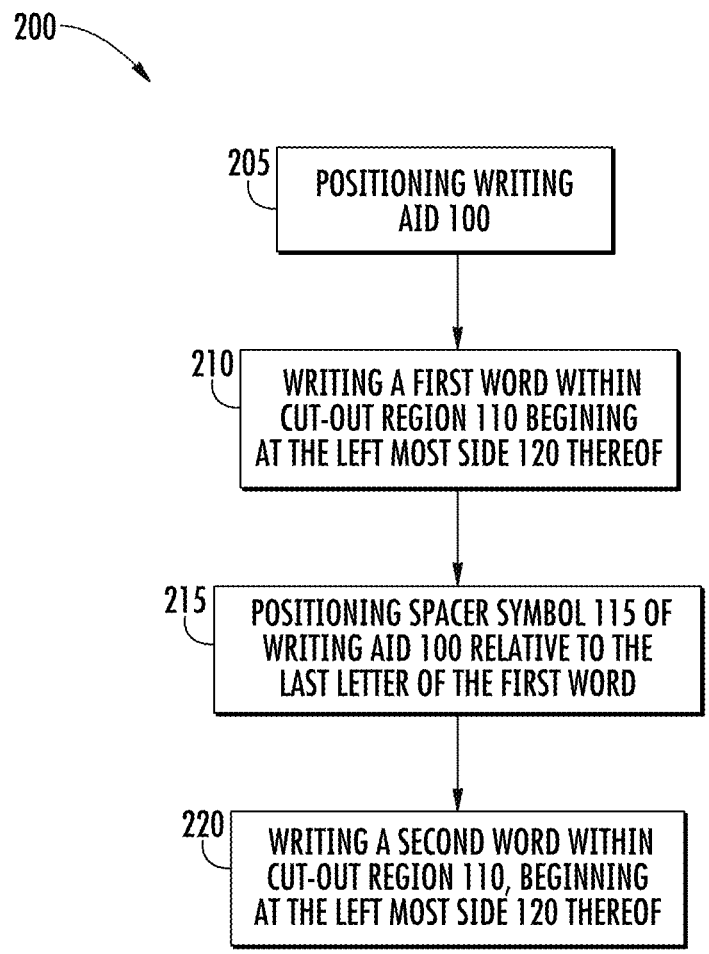
Figure 6A:
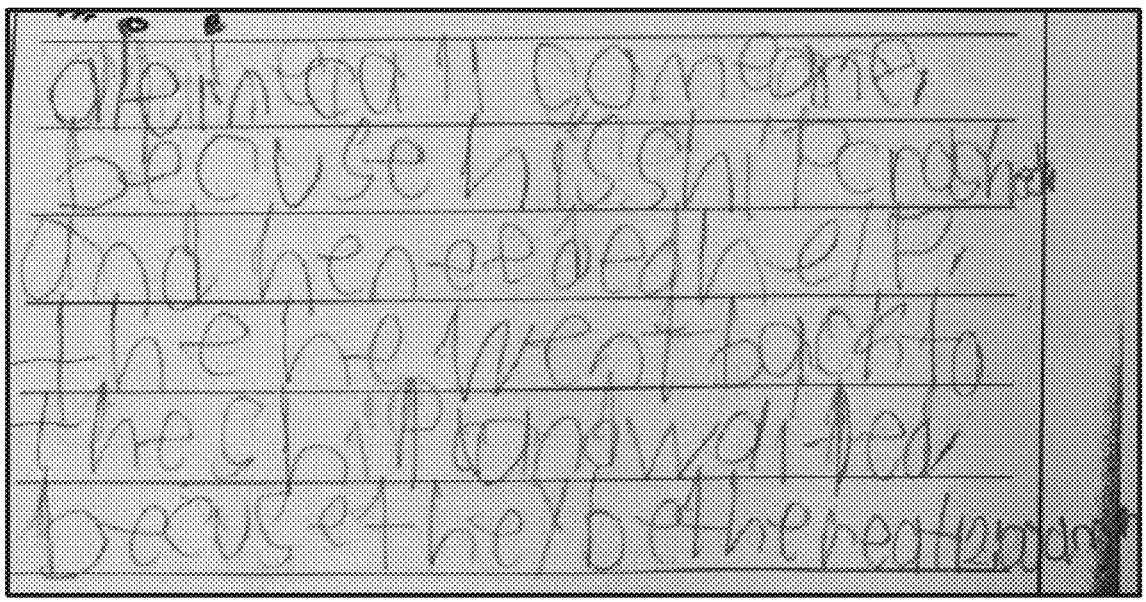
Figure 6B:
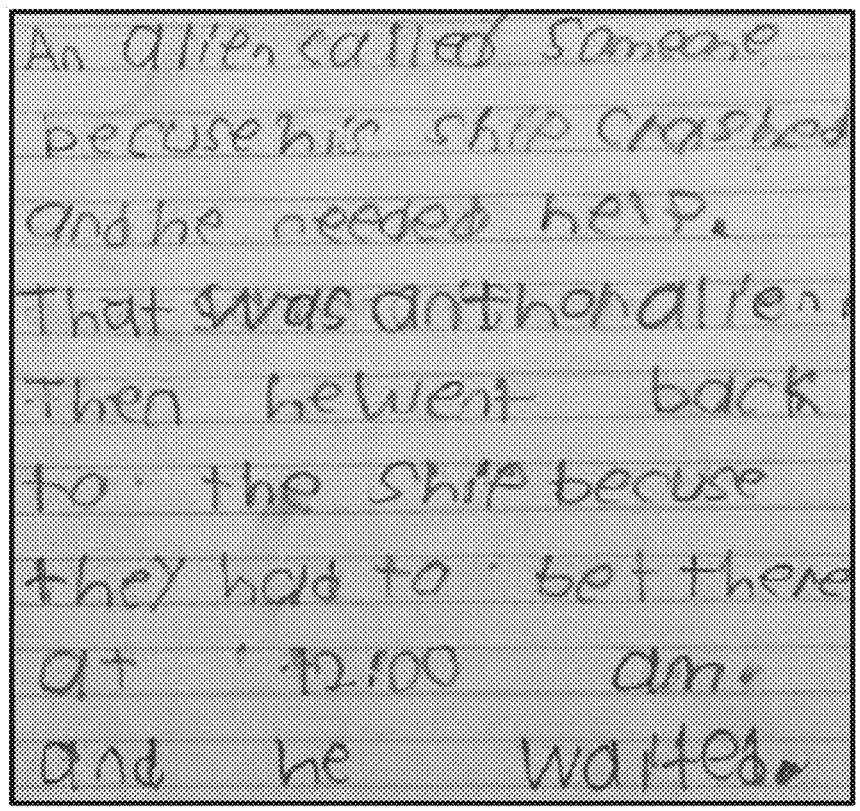

Having thus described the subject matter of the invention in general terms, reference will now be made to the accompanying Drawings, which are not necessarily drawn to scale, and wherein:

FIG. 1 illustrates perspective view of the writing aid of the invention;

FIG. 2 illustrates a top plan view of the writing aid of the invention;

FIG. 3 illustrates a perspective view of the writing aid of the invention while in use;

FIG. 4A and FIG. 4B illustrate additional perspective views of the writing aid of the invention while in use;

FIG. 5 shows a method of using the writing aid;

FIG. 6A shows a sample of a student's handwriting before using the writing aid of the invention; and FIG. 6B shows a sample of a student's handwriting while using the writing aid of the invention.

DETAILED DESCRIPTION

The subject matter of the invention now will be described more fully hereinafter with reference to the accompanying Drawings, in which some, but not all embodiments of the disclosed subject matter are shown. Like numbers refer to like elements throughout. The disclosed subject matter may be embodied in many different forms and should not be construed as limited to the embodiments set forth herein; rather, these embodiments are provided so that this disclosure will satisfy applicable legal requirements. Indeed, many modifications and other embodiments of the disclosed subject matter set forth herein will come to mind to one skilled in the art to which the disclosed subject matter pertains having the benefit of the teachings presented in the foregoing descriptions and the associated Drawings. Therefore, it is to be understood that the disclosed subject matter is not to be limited to the specific embodiments disclosed and that modifications and other embodiments are intended to be included within the scope of the appended claims.

Reference is now made to FIGS. 1-4, which are various views of writing aid 100. Writing aid 100 includes a substantially rectangular body portion 105 and a substantially rectangular cut-out region 110 formed within body portion 105. Body portion 105 may further include a spacer symbol 115 and an alignment bar 125 disposed thereon.

Body portion 105 may be in the range of about 2 inches to about 4 inches in length, in the range of about 1 inch to about 1¼ inches wide, and about 1/64 of an inch to about 1/32 of an inch thick. In one example, body portion 105 may be about 4 inches in length, about 1¼ inches wide, and about 1/64 of an inch thick. Body portion 105 may be made of plastic or any other suitable material, and is preferably transparent or semitransparent. In one example, body portion 105 may be made of a velvet textured polycarbonate material.

Cut-out region 110 may be in the range of about 1½ inches to about 2⅛ inches in length and in the range of about ⅓ of an inch to about ⅜ of an inch wide. In one example, cut-out region 110 may about 2⅛ inches in length and about ⅜ of an inch wide. Cut-out region 110 may be any of centered vertically and/or horizontally within body portion 105, or may be offset from center vertically and/or horizontally within body portion 105.

Spacer symbol 115 may be disposed on one or both sides of body portion 105, and is positioned adjacent a left most side 120 of cut-out region 110. Spacer symbol 115 may be of any shape, graphic, and/or color. In one non-limiting example, spacer symbol 115 is star shaped. Spacer symbol 115 may be one of opaque or semi-opaque in color. Depending on the size of the students writing (e.g., small or large), spacer symbol 115, when in use, may be positioned such that it either substantially covers/overlaps the last letter of a first word (as shown in FIG. 4A), or is placed just after the last letter of the first word (as shown in FIG. 4B). In one example, if the student's handwriting is generally small, spacer symbol 115 may be positioned such that it substantially covers/overlaps the last letter of a first word. In another example, if the student's handwriting is generally large, spacer symbol 115 may be placed just after the last letter of the first word. In either position (as determined by the size of the student's writing), spacer symbol 115 is configured and sized to provide an appropriate amount spacing between the first word and the second word. That is, for example, the resulting spacing between words is sufficient for a reader to clearly distinguish where one word ends and the next begins. In one example, spacer symbol 115 may be about ⅜ of an inch wide and about ⅜ of an inch in height. In the above example where spacer symbol 115 is star shaped, the star may be about ⅜ of an inch from point to point.

Body portion 105, cut-out region 110, and spacer symbol 115 may be of different sizes, e.g., larger or smaller than the examples provided herein, to accommodate a particular student's physicality and/or developmental level, and such variations in dimensions shall be deemed to be within the scope of the presently disclosed subject matter.

Alignment bar 125 may be disposed on one or both sides of body portion 105, and is positioned directly adjacent a bottom edge of cut-out region 110. In one example, alignment bar 125 is disposed on the same side of body portion 105 as that of spacer symbol 115. Alignment bar 125 runs along a least a portion of the length of cut-out region 110, and preferable may run substantially the entire length of cut-out region 110. In one example, alignment bar 125 may be about 2⅛ inches in length and may be about 1/16 of an inch wide. Alignment bar 125 may be of any color, and may be one of opaque or semi-opaque. In use, alignment bar 125 functions as a visual to assist the student with aligning and positioning the spacer along a line of the paper to be written on.

For many students, their writing becomes more legible by providing spacing between words so words do not run together. For students whose handwriting is large, the writing aid 100 provides a designated area (cut-out region 110) within which to write which often decreases the sizing of their handwriting. Again, this allows for more consistent sizing of handwriting which increases legibility. Further, alignment bar 125 helps to align the writing along the line of the paper.

Referring now to FIG. 5 is an example method 200 of using writing aid 100. For example, in a step 205, a student positions writing aid 100 at a starting point on a paper (or other article or medium), to be written on, such that alignment bar 125 properly aligns the writing aid 100 along a line on the paper that is to be written on.

In a step 210, the student writes a first word in the cut-out region 110 beginning at the left most side 120 of cut-out region 110 (shown in FIG. 3).

In a step 215, at the end of the word written in step 210, the student then moves the spacer, such that the spacer symbol 115 substantially covers/overlaps the last letter of the word (as shown in FIG. 4A), which then provides the proper amount of spacing between the previously written word and the new word to be written. Alternatively, for students with a tendency for larger handwriting, the student may move the spacer, such that the spacer symbol 115 is positioned directly after the last letter of the first word (as shown in FIG. 4B), instead of substantially covering/overlapping the last letter of the word, thus achieving proper word spacing.

In a step 220, the student begins to write a second word in the cut-out region 110, again beginning at the left most side 120 of cut-out region 110 (also as shown in FIG. 4).

The student would repeat steps 205-220, for each word of the sentence the user is writing.

FIGS. 6A and 6B show samples of a student's handwriting without using writing aid 100 and while using writing aid 100. FIG. 6A shows a short passage written by a student without the use of writing aid 100, and as can be seen the student's words run together making it difficult to distinguish where one word ends and the other begins and the letters are written quite large also making it less legible. FIG. 6B shows the same short passage re-written by the student while using writing aid 100, and as can be seen the student's words are more properly spaced apart and the letters are more appropriately sized, thus making the student's writing more legible as compared to the student's writing without using writing aid 100.

For many students, their writing becomes more legible by providing spacing between words so words do not run together. For students whose handwriting is large, the writing aid 100 provides a designated area (cut-out region 110) within which to write which often decreases the sizing of their handwriting. Again, this allows for more consistent sizing of handwriting which increases legibility. Further, alignment bar 125 helps to align the writing along the line of the paper.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A writing aid, comprising:
   a. a body portion;
   b. a rectangular cut-out region formed within the body portion, wherein the rectangular cut-out region is defined by an upper edge, an opposing lower edge spaced apart from and parallel to the upper edge, a first side edge, and an opposing second side edge spaced apart from and parallel to the first side edge, the first and second side edges being perpendicular to the upper and lower edges, and wherein the rectangular cut-out region is configured to allow a user to write a plurality of letters therein;
   c. a spacer symbol disposed on the body portion immediately adjacent a left most side edge of the rectangular cut-out region; and
   d. an alignment bar disposed on the body portion adjacent a bottom edge of the rectangular cut-out region.

2. The writing aid of claim 1, wherein the alignment bar is 2⅛ inches in length and 1/16 of an inch wide.

3. The writing aid of claim 1, wherein the alignment bar is one of opaque and semi-opaque.

4. The writing aid of claim 1, wherein the body portion is substantially rectangular.

5. The writing aid of claim 1, wherein the body portion is one of transparent and semitransparent.

6. The writing aid of claim 1, wherein the spacer symbol is one of opaque and semi-opaque.

7. The writing aid of claim 1, wherein the body portion is 4 inches in length, 1¼ of an inch wide, and 1/64 of an inch thick.

8. The writing aid of claim 1, wherein the rectangular cut-out region is 2⅛ inches in length and ⅜ of an inch wide.

9. The writing aid of claim 1, wherein the spacer symbol is ⅜ of an inch wide.

10. The writing aid of claim 1, wherein the rectangular cut-out region is centrally located within the body portion.

11. A method of using a writing aid, comprising:
    a. positioning a writing aid on an article to write on;
    b. writing a first word within a cut-out region of the writing aid beginning at the left most side of the cut-out region;
    c. moving the writing aid to position a spacer symbol disposed on the writing aid relative to a last letter of the first word; and
    d. writing a second word within the cut-out region of the writing aid beginning at the left most side of the cut-out region.

12. The method of claim 11, wherein the writing aid comprises:
    a. a body portion;
    b. a cut-out region formed within the body portion; and
    c. a spacer symbol disposed on the body portion adjacent a left most side of the cut-out region.

13. The method of claim 12, wherein the writing aid, further comprises an alignment bar disposed on the body portion adjacent a bottom edge of the cut-out region.

14. The method of claim 11, wherein moving the writing aid to position the spacer symbol comprises, positioning the writing aid such that the spacer symbol substantially overlaps the last letter of the first word.

15. The method of claim 11, wherein moving the writing aid to position the spacer symbol comprises, positioning the writing aid such that the spacer symbol is positioned directly after the last letter of the first word.

16. The method of claim 13, wherein positioning the writing aid on an article to write on, comprises aligning the alignment bar along a line of the paper to be written on.

* * * * *